(12) United States Patent
Sapuram et al.

(10) Patent No.: US 7,964,809 B2
(45) Date of Patent: Jun. 21, 2011

(54) CAM OPERATED SPRING DISCHARGE INTERLOCK MECHANISM

(75) Inventors: Sudhakar Sapuram, Andhra Pradesh (IN); Kapil Vinodrao Bavikar, Andhra Pradesh (IN); Glen Charles Sisson, Wolcott, CT (US)

(73) Assignee: General Electric Company, Schenectady, NY (US)

( * ) Notice: Subject to any disclaimer, the term of this patent is extended or adjusted under 35 U.S.C. 154(b) by 526 days.

(21) Appl. No.: 12/181,626

(22) Filed: Jul. 29, 2008

(65) Prior Publication Data
US 2010/0025204 A1   Feb. 4, 2010

(51) Int. Cl.
*H01H 9/20* (2006.01)
(52) U.S. Cl. .................. 200/50.21; 200/50.24; 361/609
(58) Field of Classification Search .............. 200/50.01, 200/50.17–50.26; 361/605–609
See application file for complete search history.

(56) References Cited

U.S. PATENT DOCUMENTS

| | | | |
|---|---|---|---|
| 2,412,954 A | 12/1946 | Zdancewicz | |
| 2,614,579 A | 10/1952 | Crockett | |
| 3,778,567 A | 12/1973 | Davies | |
| 5,036,427 A | 7/1991 | Krom et al. | |
| 6,031,192 A | 2/2000 | Liebetruth | |
| 6,160,229 A * | 12/2000 | Grelier et al. | 200/50.26 |
| 6,184,483 B1 * | 2/2001 | Coudert et al. | 200/50.21 |
| 7,821,775 B2 * | 10/2010 | Narayanasamy et al. | 361/609 |

OTHER PUBLICATIONS

Narayanasamy, Soundararajan et al. "A Spring Discharge Mechanism for Circuit Breaker," U.S. Appl. No. 12/103,075, filed Apr. 15, 2008. Specification having 17 pages, Figures having 8 Sheets.

* cited by examiner

*Primary Examiner* — Renee Luebke
*Assistant Examiner* — Marina Fishman
(74) *Attorney, Agent, or Firm* — Cantor Colburn LLP

(57) ABSTRACT

Disclosed herein is a method of moving and altering movement of a breaker mounted spring discharge interlock lever during racking and unracking of a breaker with an enclosure. The method includes, rotating a racking screw to rack the breaker into or out of the enclosure, rotating a shaft in operable communication with the racking screw, translationally moving a cam with a link having one end disconnectably connected to the cam and an opposing end disconnectably connected to a crank, that is fixedly attached to the shaft, translationally moving a cam follower that is in operable communication with the cam, moving the breaker mounted spring discharge interlock lever that is in operable communication with the cam follower, and enabling removal and replacement of the cam by disconnecting the cam from the link, thereby enabling the movement of the breaker mounted spring discharge interlock lever to be altered.

16 Claims, 10 Drawing Sheets

US 7,964,809 B2

CAM OPERATED SPRING DISCHARGE INTERLOCK MECHANISM

BACKGROUND OF THE INVENTION

The subject matter disclosed herein relates to a spring discharge interlock mechanism actuator of switchgear. Electrical codes for switchgears require interlock mechanisms for safety purposes. One such interlock requires that a breaker mechanism charging spring, be discharged whenever the breaker is in a designated location in the switchgear enclosure. This necessitates that the spring be discharged during removal of the breaker from the enclosure at a specific position. One commonly used concept is to incorporate an interlock lever on the breaker that is moved during assembly and disassembly of the breaker from the enclosure. This movement of the interlock lever interfaces with a mechanism that discharges the spring during assembly and disassembly of the breaker from the enclosure at a specific position.

A variety of different enclosure designs now exist, having varying amounts of breaker travel, or stroke, to fully rack a breaker. Since breaker mounted spring discharge mechanisms typically receive their actuation movement from the racking stroke, many different spring discharge mechanisms are utilized. These various spring discharge mechanisms also have various actuation strokes as well. Consequently, an easily adaptable system that permits use of various breaker mounted spring discharge mechanisms to be used regardless of a racking stroke of an enclosure would be well received in the art.

BRIEF DESCRIPTION OF THE INVENTION

Disclosed herein is a method of moving and altering movement of a breaker mounted spring discharge interlock lever during racking and unracking of a breaker with an enclosure. The method includes, rotating a racking screw to rack the breaker into or out of the enclosure, rotating a shaft in operable communication with the racking screw, translationally moving a cam with a link having one end disconnectably connected to the cam and an opposing end disconnectably connected to a crank, that is fixedly attached to the shaft, translationally moving a cam follower that is in operable communication with the cam, moving the breaker mounted spring discharge interlock lever that is in operable communication with the cam follower, and enabling removal and replacement of the cam by disconnecting the cam from the link, thereby enabling the movement of the breaker mounted spring discharge interlock lever to be altered.

Further disclosed herein is a breaker spring discharge actuation system. The system includes, an enclosure that is receptive of a breaker having an interlock lever in operable communication with a circuit breaker closing spring, a shaft that is rotatably disposed at the enclosure, a racking screw at the enclosure in operable communication with the shaft, a crank at the shaft, a link that is disconnectably connected to the crank, and a cam. The cam is disconnectably connected to the link and translationally movable such that rotation of the racking screw causes rotation of the shaft that rotates the crank and moves the link connected thereto that translationally moves the cam causing a cam follower to translationally move thereby moving the interlock lever biased thereagainst to allow discharging of the circuit breaker closing spring during racking of the breaker and unracking of the breaker.

Further disclosed herein is a method of changing movement of a breaker mounted spring discharge interlock lever that occurs during racking a breaker into and out of an enclosure. The method includes, removing at least one fastener that connects a first link to a first cam and the first link to a crank disposed at the enclosure that is rotatable in response to rotation of a racking screw, removing at least one of the first link and the first cam from the enclosure, placing at least one of a second link in place of the first link and a second cam in place of the first cam into the enclosure, and installing at least one fastener to fasten the first link or the placed second link to the crank and to fasten the first cam or the placed second cam to the first link or the placed second link.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
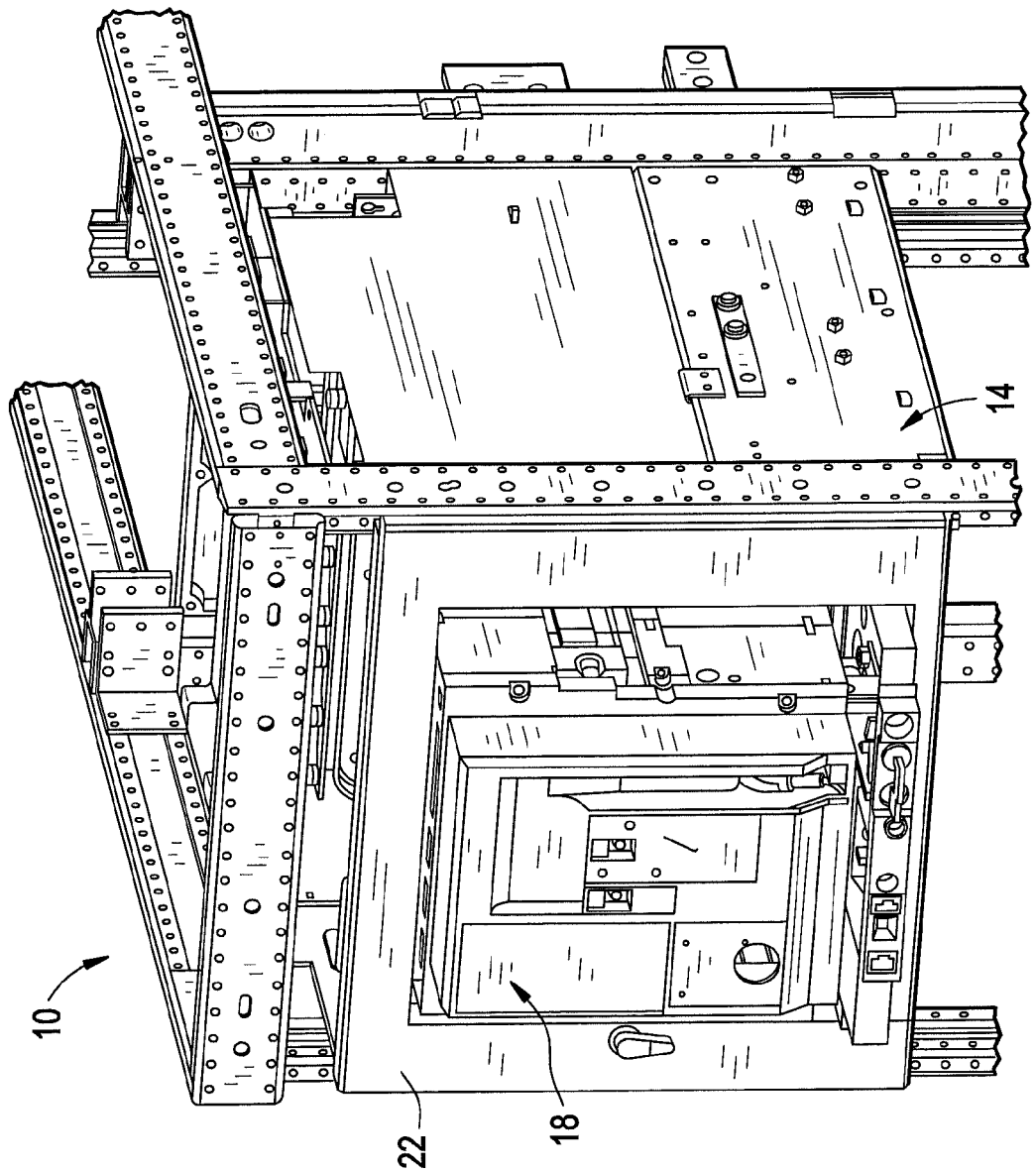
FIG. 1 depicts a perspective view of a breaker installed in a switchgear enclosure in accordance with an embodiment of the invention.
Figure 2:
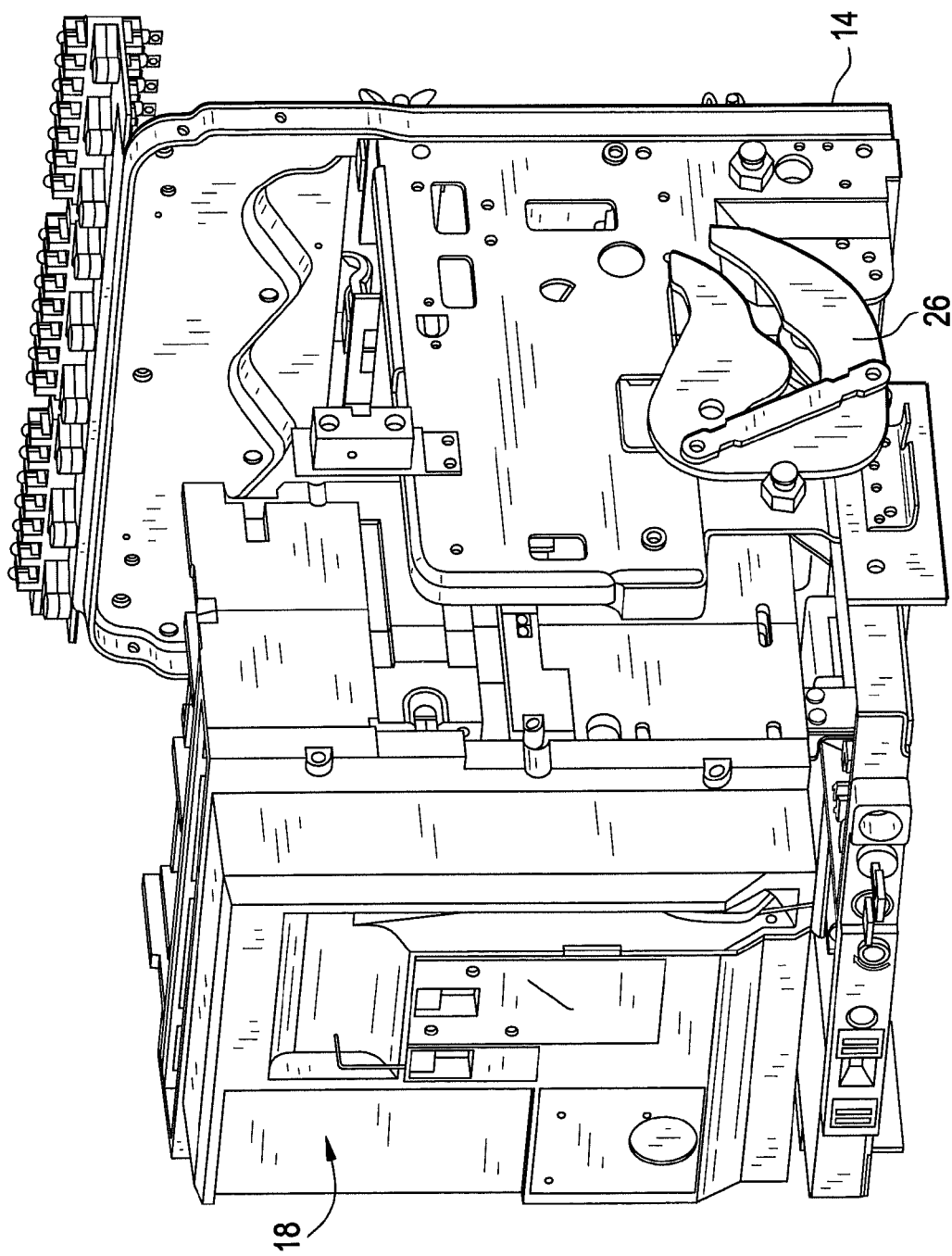
FIG. 2 depicts a perspective view of the breaker and switchgear enclosure of FIG. 1 with a portion of the enclosure housing removed.
Figure 3:
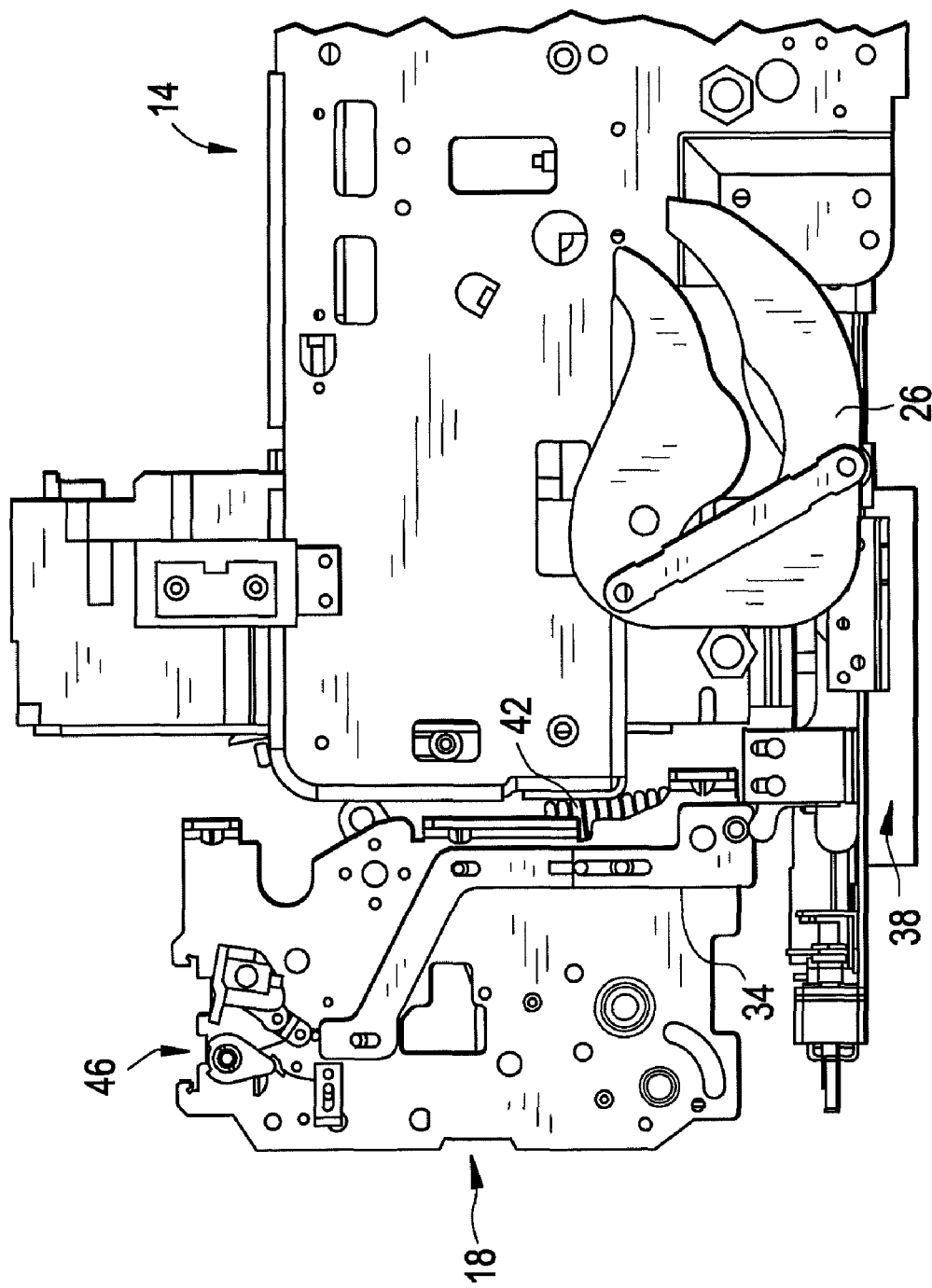
FIG. 3 depicts a side view of the breaker and switchgear enclosure of FIG. 2.

Referring to FIGS. 1-3, switchgear 10 having an enclosure 14 is illustrated with a breaker 18 assembled therein through door 22. A racking cam 26 is rotated, via rotation of a racking screw 30 (since the racking cam 26 is attached to a cross shaft that is rotationally driven by the racking screw 30 as will be described with reference to FIG. 5) that draws the breaker 18 into and out of the enclosure 14. As the breaker 18 is drawn into and out of the enclosure 14, an interlock lever 34 is translationally moved by an interlock lever actuator 38 (FIGS. 5-8) according to embodiments of the invention disclosed herein that are described in detail below.

Figure 4:
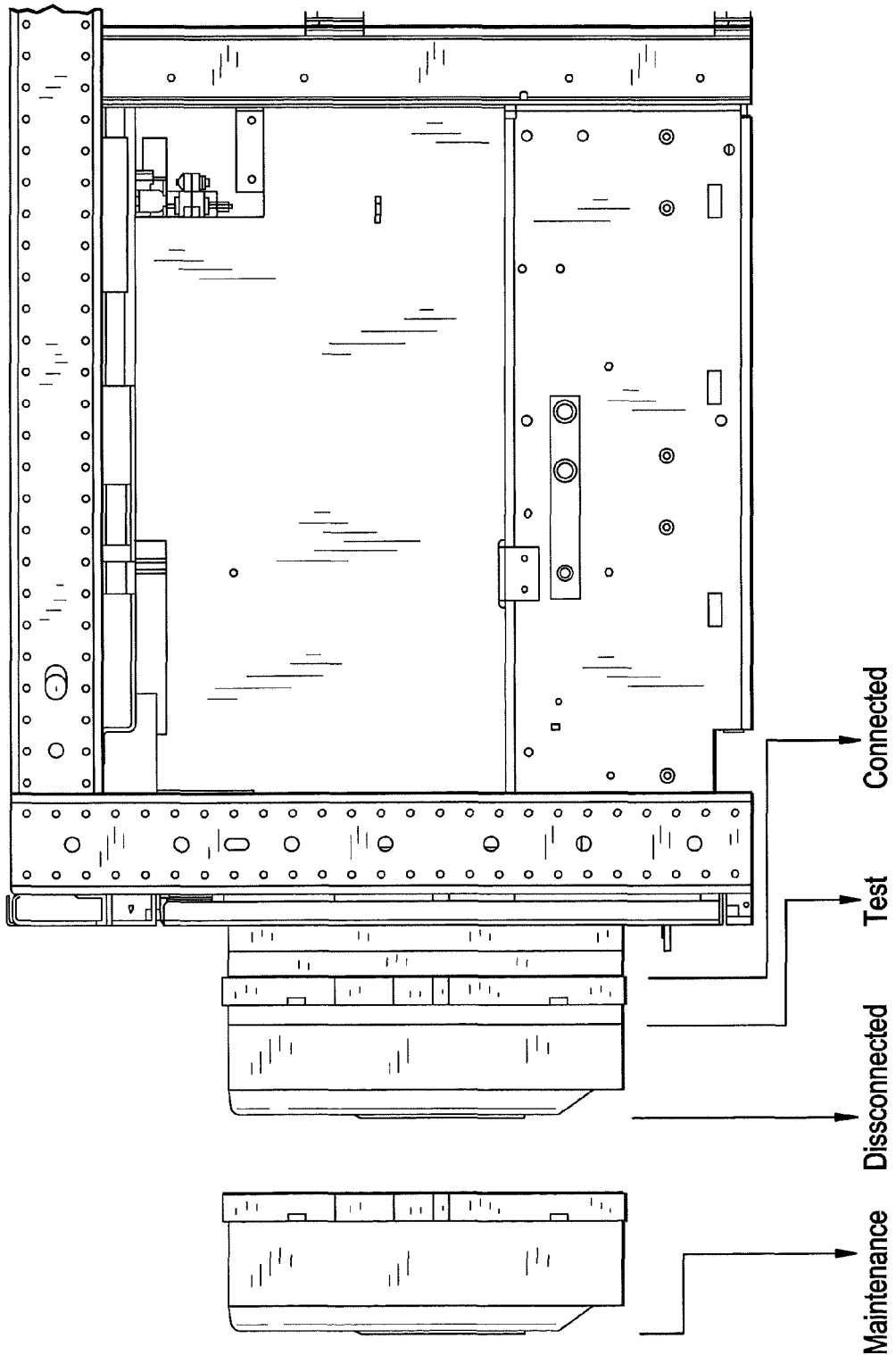
FIG. 4 depicts a side view of the breaker and switchgear enclosure of FIG. 1 at various levels of assembly into the switchgear enclosure.

Referring to FIG. 4, the breaker 18 is shown at four different levels of assembly with the enclosure 14; 'maintenance,' 'disconnected,' 'test' and 'connected.' At the maintenance level, the breaker 18 is completely removed from the enclosure 14 and is non-operational. At the connected level, the breaker 18 is completely assembled within the switchgear 10 and is fully operational. It is between the two remaining levels; disconnected and test, where embodiments disclosed herein find application. During disassembly of the breaker 18 from the enclosure 14 and specifically during the transition from the test level to the disconnected level, a spring 42 (FIG. 3), which stores energy for actuation of the breaker 18, is discharged of its energy. Alternately, during assembly of the breaker 18 to the enclosure 14, and specifically during transition from the disconnected level to the test level, the spring 42 is again discharged. The discharging of the spring 42 is actuated by a spring discharge mechanism 46 that is actuated by translational movement of the interlock lever 34 that is translationally moved by embodiments disclosed herein. Various designs of the spring discharge mechanism 46 are known to those skilled in the art that may require various strokes of the interlock lever 34 to properly actuate. One specific example of a spring discharge mechanism 46 is disclosed in copending U.S. patent application Ser. No. 12/103,075, filed Apr. 15, 2008, incorporated herein by reference in its entirety.

Figure 5:
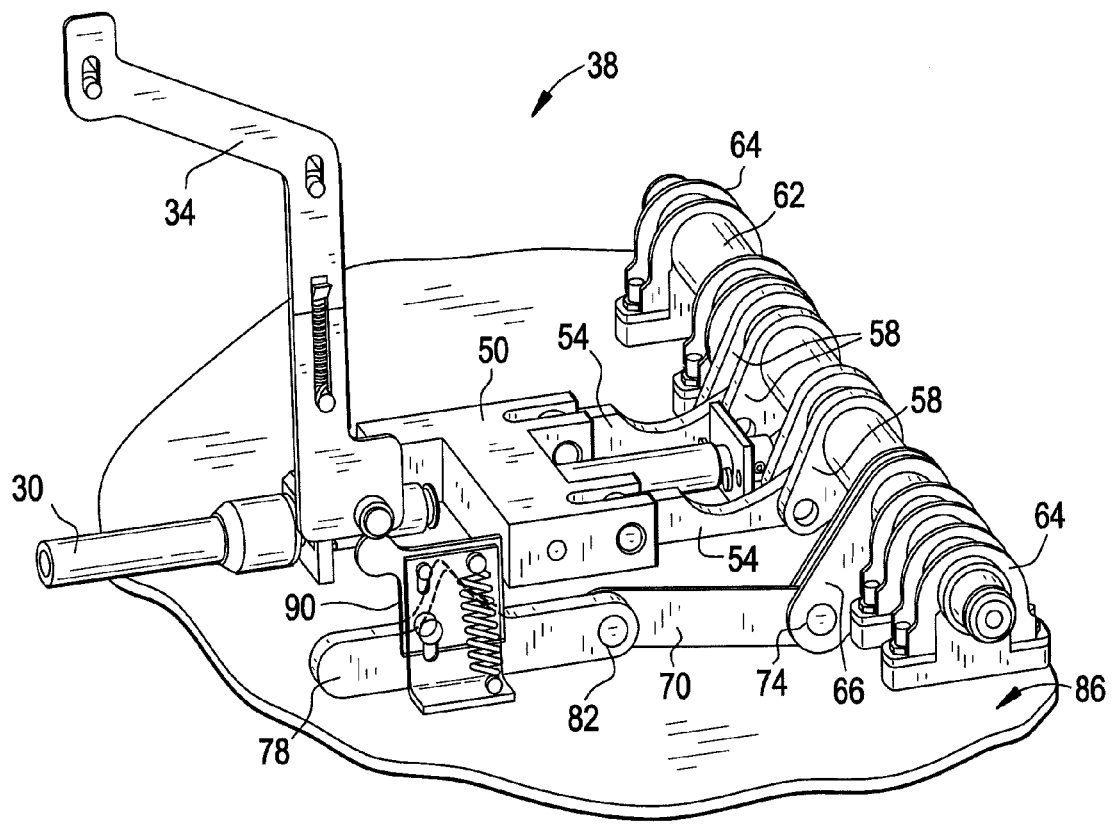
FIG. 5 depicts a perspective view of the interlock lever actuator disclosed herein.

With reference to FIG. 5, the interlock lever actuator 38 will be reviewed in detail. An operator rotates the racking screw 30 during racking on or racking off of the breaker 18 from the enclosure 14. The racking screw 30 is attached to the enclosure 14 such that rotation of the racking screw 30 causes a screw block 50, threadably engaged to the racking screw 30, to move translationally in a direction parallel with an axis of the racking screw 30. A pair of connecting links 54 are connected to the screw block 50 at one end and to a pair of cranks 58 at an opposite end. The cranks 58 are fixedly attached to a cross shaft 62 that is mounted to the enclosure 14 by bearings 64 such that it is free to rotate. The foregoing linkages result in rotation of the cross shaft 62 in response to movement of the screw block 50 due to rotation of the racking screw 30.

A second crank 66, also fixedly attached to the cross shaft 62, is pivotally attached to a link 70 by a pin 74. The pin 74 may be any removable pin as is known in the industry, such as a pin with a head on one end and a groove, receptive of a C-clip, on the other end to retain it in bore holes formed in the crank 66 and the link 70, for example. The opposite end of the link 70 is pivotally connected to a cam 78 by another pin 82, which may be similar to the pin 74. The cam 78 is translationally movable in a single axis parallel to an axis of the racking screw 30. The cam 78 is slidably engaged between a surface 86 and a pin 88 (FIG. 6) in one direction, and between an actuator plate 90 and a portion of a bracket (not shown) within the enclosure 14. The cam 78 is thereby free to slide in a back-and-forth movement in response to being driven by the link 70.

Figure 6:
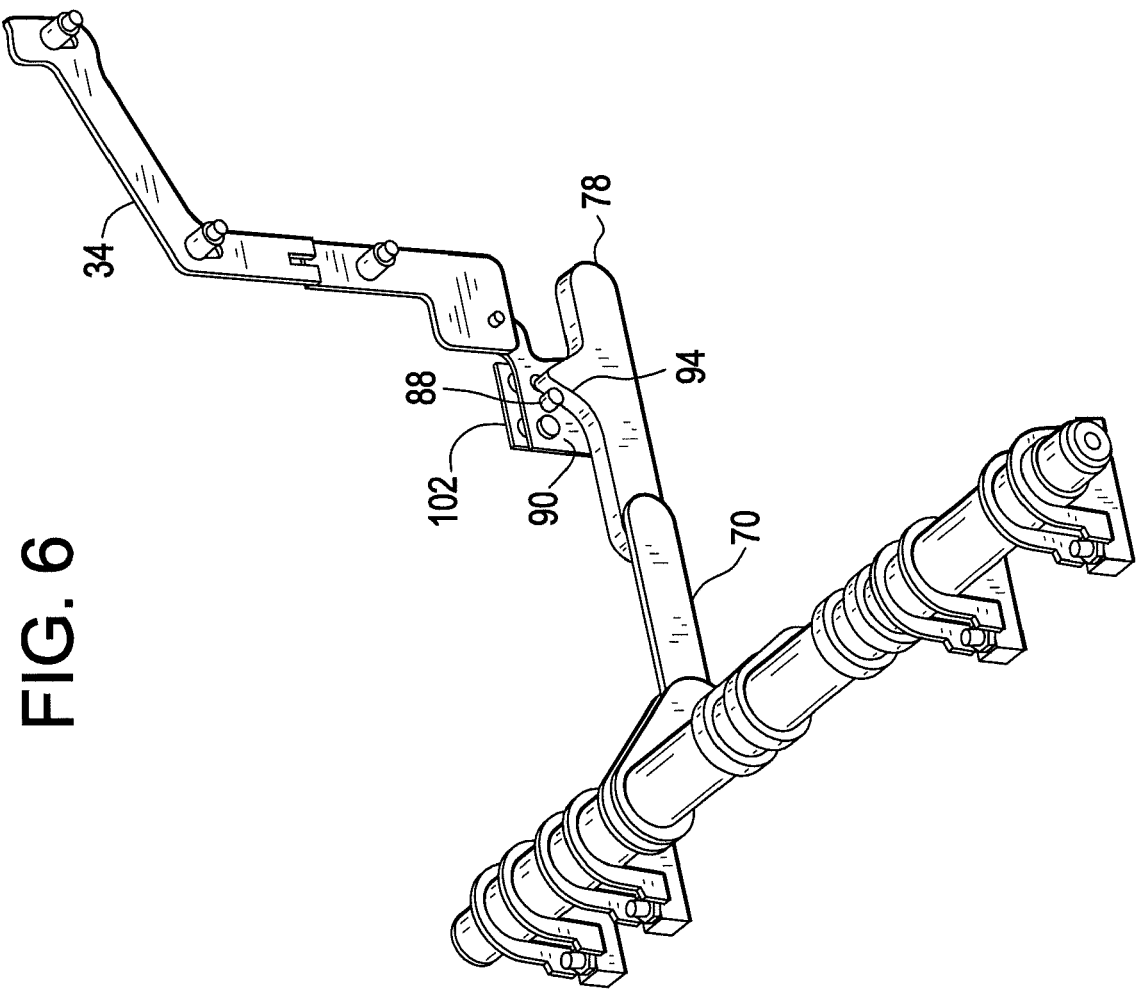
FIG. 6 depicts a reverse angle perspective view of the interlock lever actuator or FIG. 5.
Figure 7:
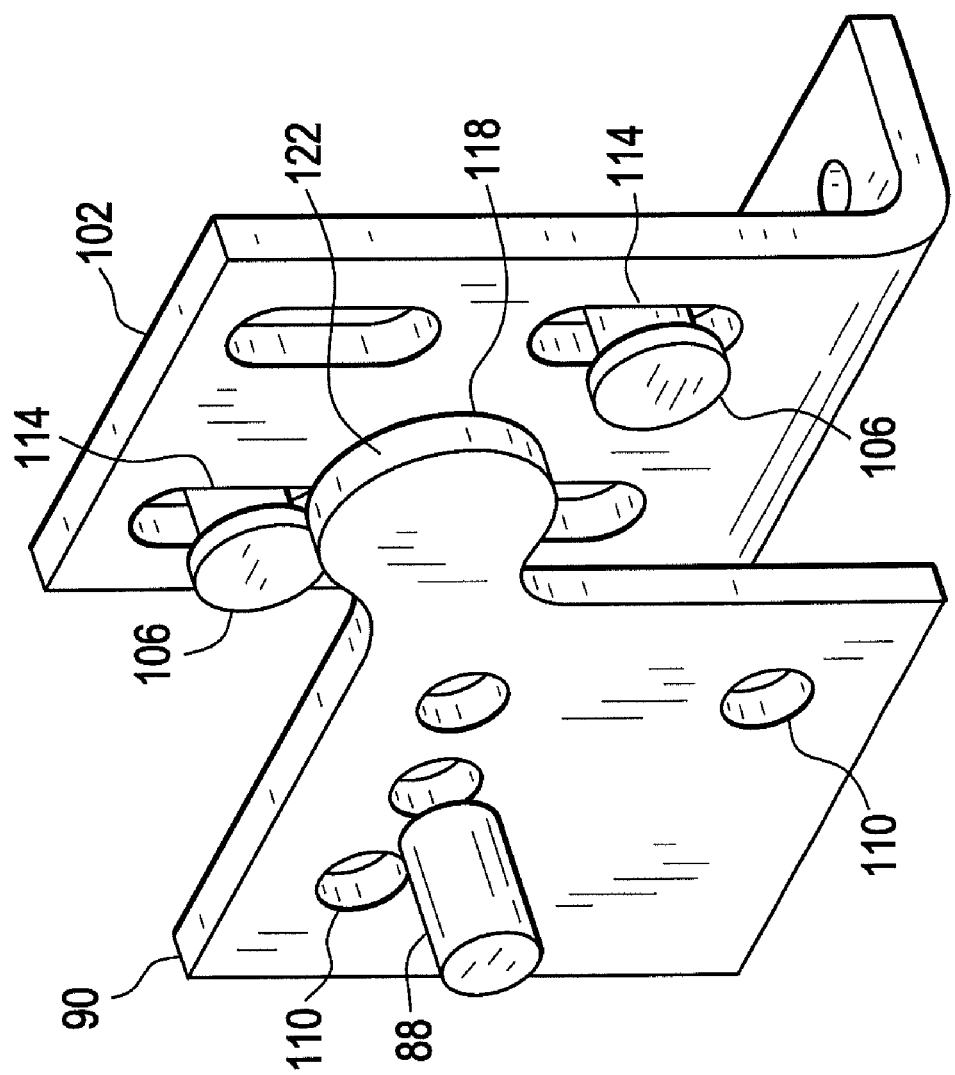
FIG. 7 depicts a reverse angle exploded perspective view of a portion of the interlock lever actuator of FIG. 5

Referring to FIGS. 6 and 7, the cam 78 has a profile 94 on a side, which in this embodiment faces upward, that engages with the pin 88, which protrudes from the actuator plate 90. This engagement causes the actuator plate 90 to follow the profile 94 as the pin 88 rides along the profile 94 in response to movement of the cam 78. As such, the actuator plate 90 follows the profile 94 and moves orthogonally to the movement of the cam 78. The actuator plate 90 is slidably engaged to a mounting plate 102 with headed pins 106 that engage holes 110 in the actuator plate 90 and slotted holes 114 in the mounting plate 102. A biasing member 116, shown herein as a tension spring, biases the actuator plate 90 toward the surface 86 to maintain contact between the pin 88 and the profile 94. The actuator plate 90 also has a lobe 118 attached thereto that has a profile 122 thereon. Translational movement of the actuator plate 90 and the lobe 118 positions the profile 122 in a location receptive to engagement with the interlock lever 34 during racking of the breaker 18 into and out of the enclosure 14.

Figure 8:
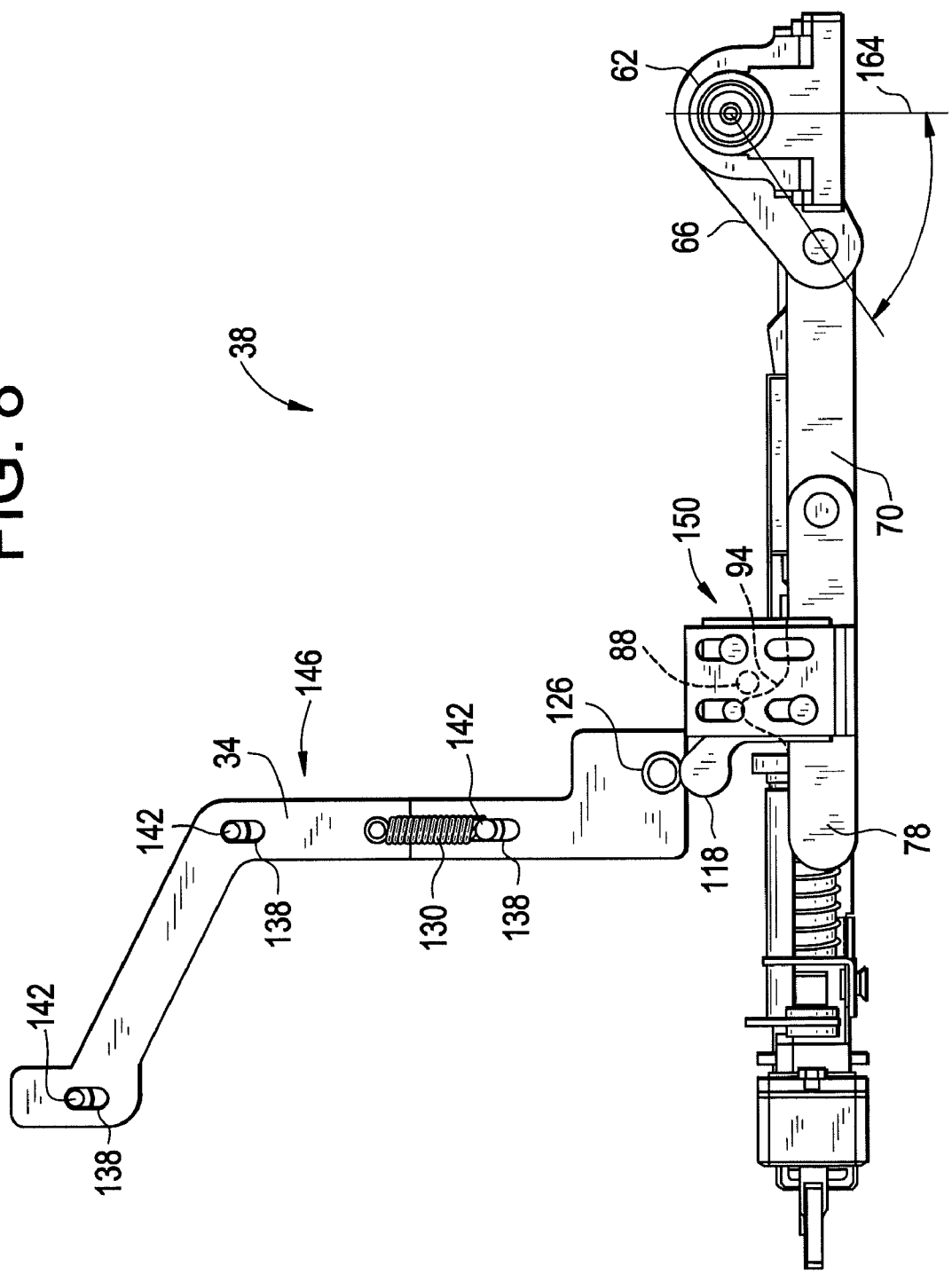
FIG. 8 depicts a side view of the interlock lever actuator of FIG. 5.
Figure 9:
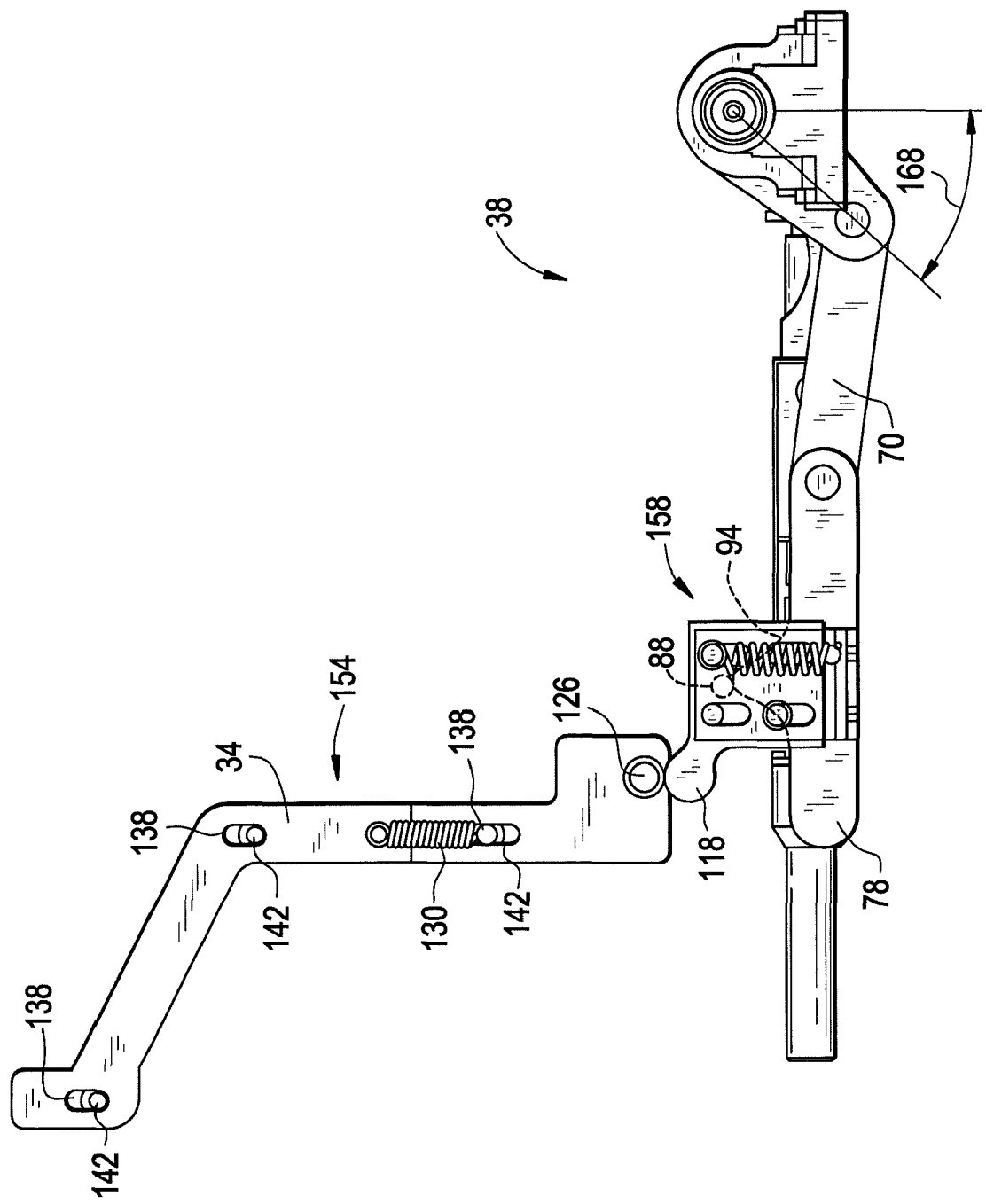
FIG. 9 depicts a side view of the interlock lever actuator of FIG. 5 in an alternate position of actuation to of that of FIG. 8.

Referring to FIGS. 8 and 9, the interlock lever 34 includes a pin 126 (or roller) that engages with the profile 122 on the lobe 118. A biasing member 130, illustrated herein as a tension spring, biases the interlock lever 34 toward the actuator plate 90 to insure consistent contact between the pin 126 and the profile 122. The interlock lever 34 includes three slotted holes 138 through which three pins 142 extending from the breaker 18 protrude to orient the interlock lever 34 relative to the breaker 18. The interlock lever 34 is illustrated in a non-actuated position 146 in FIG. 8 as can be observed by the relative position of the pins 142 relative to the slotted holes 138. This is due to the actuator plate 90 being in a non-actuated position 150, since the pin 88 is not moved by the profile 94 (note pin 88 and profile 94 are shown with dashed hidden lines). The non-actuated position 146 may correlate with the breaker 14 being in the disconnected level, for example, as illustrated in FIG. 4. Conversely, the interlock lever 34 is illustrated in an actuated position 154 in FIG. 9 as can be observed by the relative position of the pins 142 to the slotted holes 138. This is due to the actuator plate 90 being in an actuated position 158, since the pin 88 is moved by the profile 94 to a furthest allowable position of travel. The actuated position 154 may correlate with the breaker 14 being in the level between test and disconnected level, for example, as illustrated in FIG. 4. Movement of pin 88 from the non-actuated position 150 to the actuated position 158 is due to movement of the cam 78 and link 70 in response to rotation of the cross shaft 62 moving the crank 66 from a crank angle 164 to a crank angle 168.

Figure 10:
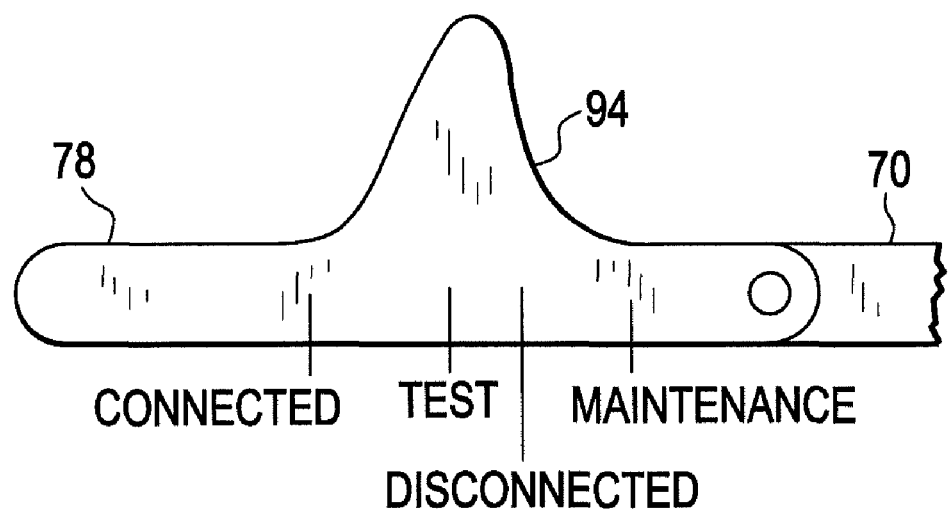
FIG. 10 depicts a side view of a cam disclosed in FIGS. 5-8.
Figure 11:
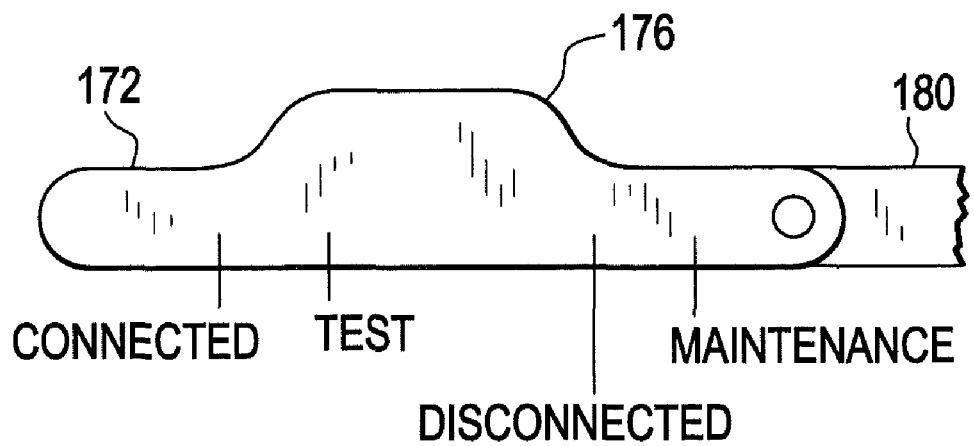
FIG. 11 depicts a side view of a cam having an alternate profile than that of FIG. 10.

Referring to FIGS. 10 and 11, the cam 78 and link 70 in embodiments illustrated in FIGS. 5-9 above may accommodate the breaker-racking stroke and the interlock lever 34 actuation stroke for the particular switchgear enclosure 14 and the particular breaker 18, for example. However, alternate switchgear enclosures may have differing breaker racking strokes and differing breaker interlock lever actuation strokes from those embodied herein such that the cam 78 and the link 70 do not actuate the interlock lever 34 at a position of the racking stroke or an adequate dimension needed to properly actuate the spring discharge mechanism. For example, the cam 78 with the profile 94 and the link 70, disclosed herein and shown magnified in FIG. 10, may provide actuation of the interlock lever 34 relative to the cam 78 at maintenance, disconnected, test and connected levels that correlate with those described in FIG. 4 above. However, an alternate enclosure and breaker combination may instead require maintenance, disconnected, test and connected levels that correlate with different locations along a cam as shown in FIG. 11. In such a situation, an alternate cam and link may be needed. Cam 172 with a profile 176 and link 180, for example, may satisfy the new requirement. Additionally, other embodiments of cams and links may be utilized for still other enclosure and breaker combinations. Embodiments of spring discharge actuators disclosed herein, therefore, allow for a simple change of a cam and a link through removal of a single pin to accommodate enclosures and breakers with a variety of breaker racking strokes and interlock lever strokes.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of moving and altering movement of a breaker mounted spring discharge interlock lever during racking and unracking of a breaker with an enclosure, comprising:
    rotating a racking screw to rack the breaker into or out of the enclosure;
    rotating a shaft in operable communication with the racking screw;
    translationally moving a cam with a link, the link having one end disconnectably connected to the cam and an opposing end disconnectably connected to a crank, the crank being fixedly attached to the shaft;
    translationally moving a cam follower that is in operable communication with the cam;
    moving the breaker mounted spring discharge interlock lever that is in operable communication with the cam follower; and
    enabling removal and replacement of the cam by disconnecting the cam from the link, thereby enabling the movement of the breaker mounted spring discharge interlock lever to be altered.

2. The method of claim 1 further comprising moving a screw block in operable communication with the racking screw.

3. The method of claim 2 further comprising rotating the shaft in response to the movement of the screw block that is connected to at least one crank arm fixedly attached to the shaft.

4. The method of claim 2 further comprising translationally moving the cam in a direction parallel to the movement of the screw block.

5. The method of claim 1 further comprising translationally moving the cam follower in a direction orthogonal to the translational movement of the cam.

6. The method of claim 1 further comprising defining the translational movement of the cam by slidably engaging the cam on at least three sides.

7. The method of claim 1 further comprising biasing the cam follower toward the cam with at least one biasing member.

8. The method of claim 1 further comprising biasing the cam follower toward the cam with gravity.

9. The method of claim 1 further comprising defining the translational movement of the cam follower with a profile on the cam.

10. The method of claim 9 further comprising following the profile with a pin of the cam follower as the cam moves.

11. A breaker spring discharge actuation system, comprising:
    an enclosure being receptive of a breaker having an interlock lever in operable communication with a circuit breaker closing spring;
    a shaft being rotatably disposed at the enclosure;
    a racking screw disposed at the enclosure in operable communication with the shaft;
    a crank disposed at the shaft;
    a link being disconnectably connected to the crank; and
    a cam being disconnectably connected to the link and translationally movable such that rotation of the racking screw causes rotation of the shaft that rotates the crank and moves the link connected thereto that translationally moves the cam causing a cam follower to translationally move thereby moving the interlock lever biased thereagainst to allow discharging of the circuit breaker closing spring during racking of the breaker and unracking of the breaker.

12. The breaker spring discharge actuation system of claim 11, wherein the movement of the interlock lever is altered by changing at least one of the link and the cam.

13. The breaker spring discharge actuation system of claim 11, wherein a pin disconnectably connects the link to the crank through holes in the link and the crank.

14. The breaker spring discharge actuation system of claim 11, wherein a pin disconnectably connects the link to the cam through holes in the link and the cam.

15. A method of changing movement of a breaker mounted spring discharge interlock lever that occurs during racking a breaker into and out of an enclosure, comprising:
    removing at least one fastener that connects a first link to a first cam and the first link to a crank disposed at the enclosure, the crank being rotatable in response to rotation of a racking screw;
    removing at least one of the first link and the first cam from the enclosure;
    placing at least one of a second link in place of the first link and a second cam in place of the first cam into the enclosure; and
    installing at least one fastener to fasten the first link or the placed second link to the crank and to fasten the first cam or the placed second cam to the first link or the placed second link.

16. The method of claim 15 further comprising selecting at least one of the second link and the second cam to provide an actuation movement required to properly actuate a second breaker mounted spring discharge interlock lever.

* * * * *